United States Patent
Lin et al.

(10) Patent No.: US 11,945,902 B2
(45) Date of Patent: Apr. 2, 2024

(54) TWO-COMPONENT POLYURETHANE COMPOSITION

(71) Applicants: Dow Global Technologies LLC, Midland, MI (US); Rohm and Haas Company, Collegeville, PA (US)

(72) Inventors: Daoshu Lin, Shanghai (CN); Baoqing Zheng, Shanghai (CN); Jia Tang, Shanghai (CN); Dong Yun, Shanghai (CN); Shujun Shu, Shanghai (CN); Gary W. Dombrowski, Chester Springs, PA (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 604 days.

(21) Appl. No.: 17/265,328

(22) PCT Filed: Sep. 21, 2018

(86) PCT No.: PCT/CN2018/106964
§ 371 (c)(1),
(2) Date: Feb. 2, 2021

(87) PCT Pub. No.: WO2020/056727
PCT Pub. Date: Mar. 26, 2020

(65) Prior Publication Data
US 2021/0309791 A1   Oct. 7, 2021

(51) Int. Cl.
| | | |
|---|---|---|
| C08G 18/67 | (2006.01) | |
| C08G 18/73 | (2006.01) | |
| C08L 43/02 | (2006.01) | |
| C08L 75/04 | (2006.01) | |
| C09D 133/14 | (2006.01) | |
| C09D 143/02 | (2006.01) | |
| C09D 175/04 | (2006.01) | |
| C09D 175/14 | (2006.01) | |
| C09D 175/16 | (2006.01) | |
| C09K 23/00 | (2022.01) | |
| C09K 23/02 | (2022.01) | |
| C09K 23/14 | (2022.01) | |
| C09K 23/16 | (2022.01) | |

(52) U.S. Cl.
CPC ......... *C08G 18/6785* (2013.01); *C08G 18/67* (2013.01); *C08G 18/73* (2013.01); *C08L 43/02* (2013.01); *C08L 75/04* (2013.01); *C09D 133/14* (2013.01); *C09D 143/02* (2013.01); *C09D 175/04* (2013.01); *C09D 175/14* (2013.01); *C09D 175/16* (2013.01); *C09K 23/00* (2022.01); *C09K 23/017* (2022.01); *C09K 23/02* (2022.01); *C09K 23/16* (2022.01); *C09K 23/14* (2022.01)

(58) Field of Classification Search
CPC .... C08G 18/6785; C08G 18/73; C08G 18/67; C08L 43/02; C08L 75/04; C09D 143/02; C09D 175/16; C09D 133/14; C09D 175/04; C09D 175/14; C09K 23/00; C09K 23/02; C09K 23/16; C09K 23/14; C09K 23/017
See application file for complete search history.

(56) References Cited

U.S. PATENT DOCUMENTS

| | | |
|---|---|---|
| 5,663,272 A | 9/1997 | Slack et al. |
| 6,028,158 A | 2/2000 | Slack et al. |
| 9,365,739 B2 | 6/2016 | Dombrowski et al. |
| 2002/0058749 A1 | 5/2002 | Larson et al. |
| 2004/0034164 A1 | 2/2004 | Melchiors et al. |
| 2006/0155095 A1 | 7/2006 | Agryropoulbs |
| 2014/0121317 A1 | 5/2014 | Takahashi et al. |
| 2018/0258315 A1 | 9/2018 | Roller et al. |

FOREIGN PATENT DOCUMENTS

| | | |
|---|---|---|
| CN | 1814663 | 8/2006 |
| CN | 100363421 C | 8/2006 |
| CN | 107057545 A | 8/2017 |
| JP | 2003119350 A | 4/2003 |

OTHER PUBLICATIONS

Chinese Office Action for the correspodning Chinese Application No. 201880096703.5; dated Dec. 17, 2021; 2 pages.
European Search Report for corresponding European Application No. 18933783.5; dated Mar. 17, 2022 (10 pgs.).

*Primary Examiner* — Rabon A Sergent
(74) *Attorney, Agent, or Firm* — Susan M. Zerull

(57) ABSTRACT

A two-component polyurethane composition comprising: an aqueous dispersion comprising an emulsion polymer and a specific sulphate and/or sulfonate surfactant, and a water-dispersible polyisocyanate; the emulsion polymer with a weight average molecular weight of 70,000 g/mol or less comprising, by weight based on the weight of the emulsion polymer, greater than 0.25% of structural units of a phosphorous-containing acid monomer and/or salts thereof, greater than 15% of structural units of a hydroxy-functional alkyl (meth)acrylate, structural units of an monoethylenically unsaturated nonionic monomer, and from zero to 10% of structural units of an additional acid monomer and/or salts thereof; and a process of preparing the two-component polyurethane composition.

15 Claims, No Drawings

TWO-COMPONENT POLYURETHANE COMPOSITION

FIELD OF THE INVENTION

The present invention relates to a two-component polyurethane composition and a process of preparing the same.

INTRODUCTION

Conventional solvent-borne two-component polyurethane coating compositions provide excellent appearance but usually contain high volatile organic compound (VOC) content. Water-borne two-component polyurethane coating compositions comprising water-dispersible isocyanates and conventional emulsion polymers significantly reduce the VOC content and have a reasonable cure speed, but yet fail to provide coatings having satisfactory appearance properties (such as gloss fullness). To solve these problems, U.S. Pat. No. 9,365,739 discloses waterborne two component polyurethane coating compositions comprising a cycloaliphatic diol or polyol and an acrylic emulsion polymer prepared by emulsion polymerization of 41% butyl acrylate/46% methyl methacrylate/10% hydroxyethyl methacrylate/3% methacrylic acid, by weight based on the total weight of monomers. There is still room to further improve gloss, hardness and chemical resistance of the resultant coatings. During application, components in two-component polyurethane compositions are mixed first, and then applied to a substrate typically within about 3 to 6 hours. Within such application period, it is also desirable for the polyurethane composition to provide coatings with no significant gloss loss (also known as "good gloss retention"). For example, the polyurethane composition, even after storage at room temperature for about 6 hours, can still provide coatings with a 60° gloss of 70 or more.

There remains the need to provide a two-component polyurethane composition, which demonstrates improved gloss upon curing without compromising mechanical properties (e.g., hardness and chemical resistance), and even after storage for a period of time (e.g., 6 hours), still provides coatings with good gloss retention.

SUMMARY OF THE INVENTION

The present invention provides a two-component polyurethane composition, particularly suitable for coatings. The polyurethane composition provides coatings made therefrom with a 60° gloss of 90 or more, and even after storage at room temperature (20-25° C.) for at least 6 hours, still provides coatings made therefrom with a 60° gloss of 70 or more. The polyurethane composition can also provide coatings with high hardness of H or harder, and/or sufficient chemical resistance to sustain more than 200 times of methyl ethyl ketone (MEK) rubs. Gloss, hardness and chemical resistance can be measured according to the test methods described in the Examples section.

In a first aspect, the present invention is a two-component polyurethane composition comprising,
(A) an aqueous dispersion comprising an emulsion polymer and a surfactant selected from the group consisting of a sulphate surfactant, a sulfonate surfactant containing no carboxyl or carboxylate group, or mixtures thereof; wherein the emulsion polymer with a weight average molecular weight of 70,000 g/mol or less comprises, by weight based on the weight of the emulsion polymer,
greater than 0.25% of structural units of a phosphorous-containing acid monomer and/or a salt thereof, greater than 15% of structural units of a hydroxy-functional alkyl (meth)acrylate, structural units of a monoethylenically unsaturated nonionic monomer, and from zero to 10% of structural units of an additional acid monomer and/or a salt thereof; and
(B) a water-dispersible polyisocyanate.

In a second aspect, the present invention is a process of preparing the two-component polyurethane composition of the first aspect. The process comprises:
(i) providing an aqueous dispersion comprising an emulsion polymer with a weight average molecular weight of 70,000 g/mol or less and a surfactant selected from the group consisting of a sulphate surfactant, a sulfonate surfactant containing no carboxyl or carboxylate group, or mixtures thereof; wherein the emulsion polymer prepared by emulsion polymerization in the presence of a chain transfer agent comprises, by weight based on the weight of the emulsion polymer,
greater than 0.25% of structural units of a phosphorous-containing acid monomer and/or a salt thereof, greater than 15% of structural units of a hydroxy-functional alkyl (meth)acrylate, structural units of a monoethylenically unsaturated nonionic monomer, and from zero to 10% of structural units of an additional acid monomer and/or a salt thereof; and
(ii) mixing the aqueous dispersion from step (i) with a water-dispersible polyisocyanate.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

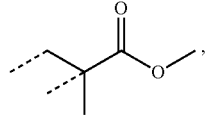

where the dotted lines represent the points of attachment of the structural unit to the polymer backbone.

As used herein, unless otherwise indicated, the term "polyisocyanate" refers to any isocyanate functional molecule having two or more isocyanate groups.

The emulsion polymer useful in the present invention is a hydroxyl group-containing polymer. The emulsion polymer may comprise structural units of one or more phosphorous-containing acid monomers and/or salts thereof. Examples of suitable phosphorous-containing acid monomers and salts thereof include phosphoalkyl (meth)acrylates such as phosphoethyl (meth)acrylate, phosphopropyl (meth)acrylate, phosphobutyl (meth)acrylate, salts thereof, and mixtures thereof; $CH_2=C(R_1)-C(O)-O-(R_2O)_q-P(O)(OH)_2$, wherein $R_1=H$ or $CH_3$, $R_2=$alkylene, such as an ethylene group, a propylene group, or a combination thereof; and q=1-20, such as SIPOMER PAM-100, SIPOMER PAM-200, SIPOMER PAM-300, SIPOMER PAM-600 and SIPOMER PAM-4000 all available from Solvay; phosphoalkoxy (meth) acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers are selected from the group consisting of phosphoethyl (meth)acrylate, phosphopropyl (meth)acrylate, phosphobutyl (meth)acrylate, allyl ether phosphate, salts thereof, or mixtures thereof; more preferably, phosphoethyl methacrylate (PEM). The emulsion polymer may comprise, by weight based on the weight of the emulsion polymer, greater than 0.25% of structural units of the phosphorous-containing acid monomers and salts thereof, for example, 0.3% or more, 0.5% or more, 0.7% or more, 0.9% or more, 1.1% or more, 1.3% or more, 1.5% or more, or even 1.7% or more, and at the same time, 10% or less, 8% or less, 6% or less, 5% or less, 4% or less, 3.5% or less, 3% or less, 2.5% or less, or even 2% or less. "Weight of the emulsion polymer" refers to the dry or solids weight of the emulsion polymer.

The emulsion polymer useful in the present invention may further comprise structural units of one or more hydroxy-functional alkyl (meth)acrylates. Examples of suitable hydroxy-functional alkyl (meth)acrylates include hydroxyethyl (meth)acrylates including, for example, 2-hydroxyethyl acrylate and 2-hydroxyethyl methacrylate; hydroxypropyl (meth)acrylates including, for example, 2-hydroxypropylacrylate, 2-hydroxypropyl methacrylate, 3-hydroxypropyl acrylate, and 3-hydroxypropyl methacrylate; hydroxybutyl (meth)acrylates including, for example, 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; and mixtures thereof. Preferred hydroxy-functional alkyl (meth)acrylates include 2-hydroxyethyl acrylate, 2-hydroxyethyl methacrylate, 3-hydroxypropyl acrylate, 3-hydroxypropyl methacrylate, or mixtures thereof. The emulsion polymer may comprise, by weight based on the weight of the emulsion polymer, greater than 15% of structural units of the hydroxy-functional alkyl (meth)acrylates, for example, 17% or more, 20% or more, 23% or more, 25% or more, 27% or more, 30% or more, or even 32% or more, and at the same time, 50% or less, 48% or less, 45% or less, 42% or less, 40% or less, 38% or less, 36% or less, or even 34% or less.

The emulsion polymer useful in the present invention may also comprise structural units of one or more monoethylenically unsaturated nonionic monomers that are different from the monomers described above. "Nonionic monomers" herein refers to monomers that do not bear an ionic charge between pH=1-14. The monoethylenically unsaturated nonionic monomers may include vinyl aromatic monomers, alkyl (meth)acrylates, acrylonitrile, and mixtures thereof. Suitable vinyl aromatic monomers may include, for example, styrene; substituted styrene such as methylstyrene, alpha-methylstyrene, trans-beta-methylstyrene, 2,4-dimethylstyrene, ethylstyrene, butylstryene, and p-methoxystyrene; o-, m-, and p-methoxystyrene; and p-trifluoromethylstyrene; or mixtures thereof. The alkyl (meth)acrylates can be $C_1$-$C_{20}$-alkyl, $C_1$-$C_{18}$-alkyl, $C_1$-$C_{12}$-alkyl, or $C_1$-$C_4$-alkyl (meth)acrylates. Specific examples of alkyl (meth)acrylates include methyl acrylate, methyl methacrylate, ethyl acrylate, ethyl methacrylate, butyl acrylate, butyl methacrylate, tert-butyl acrylate, tert-butyl methacrylate, iso-butyl acrylate, iso-butyl methacrylate, 2-ethylhexyl acrylate, nonyl acrylate, decyl acrylate, lauryl acrylate, cyclohexyl methacrylate, cyclohexyl acrylate, tert-butyl cyclohexyl methacrylate, trimethylcyclohexyl methacrylate, isobornyl methacrylate, isobornyl acrylate, tetrahydrofuran methacrylate, dicyclopentadienyl acrylate, dicyclopentadienyl methacrylate, and combinations thereof. The monoethylenically unsaturated nonionic monomers preferably include styrene in combination of one or more alkyl (meth)acrylates. Preferred monoethylenically unsaturated nonionic monomers are styrene, methyl methacrylate, cyclohexyl methacrylate, tert-butyl methacrylate, butyl acrylate, 2-ethylhexyl acrylate, or mixtures thereof. The emulsion polymer may comprise, based on the weight of the emulsion polymer, from 30% to 80%, from 40% to 77%, from 50% to 74%, or from 60% to 72%, of structural units of the monoethylenically unsaturated nonionic monomers.

The emulsion polymer useful in the present invention may also comprise structural units of one or more additional acid monomers and/or salts thereof. The additional acid monomers can be carboxylic acid monomers, sulfonic acid monomers, and mixtures thereof. The carboxylic acid monomers can be $\alpha,\beta$-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. Specific examples of carboxylic acid monomers include acrylic acid, methacrylic acid, maleic acid, itaconic acid, crotonic acid, fumaric acid, 2-carboxyethyl acrylate, and mixtures thereof. The sulfonic acid monomers may include sodium vinyl sulfonate (SVS), sodium styrene sulfonate (SSS) and acrylamido-methyl-propane sulfonate (AMPS); and salts thereof. Preferably, the additional acid monomer is an $\alpha,\beta$-ethylenically unsaturated carboxylic acid, for example, acrylic acid, methacrylic acid, itaconic acid, and mixtures thereof. The emulsion polymer may comprise, by weight based on the weight of the emulsion polymer, from zero to 10%, from 0.5% to 5%, from 1% to 3%, or from 1.5% to 2%, of structural units of the additional acid monomer.

The emulsion polymer useful in the present invention may also comprise structural units of one or more ethylenically unsaturated monomers having one or more functional groups selected from amide, acetoacetate, carbonyl, ureido, silane, amino, or combinations thereof. Suitable functional group containing monomers may include, for example, amino-functional monomers such as dimethylaminoethyl methacrylate, dimethylaminoethyl acrylate, dimethylaminopropyl methacrylate, dimethylaminopropyl acrylate; ureido-functional monomers such as hydroxyethyl ethylene urea methacrylate, hydroxyethyl ethylene urea acrylate, such as SIPOMER WAM II; monomers bearing acetoacetate-functional groups such as acetoacetoxyethyl methacrylate (AAEM), acetoacetoxyethyl acrylate, acetoacetoxypropyl methacrylate, acetoacetoxypropyl acrylate, allyl acetoacetate, acetoacetoxybutyl methacrylate, acetoacetoxybutyl methacrylate, acetoacetamidoethyl methacrylate, acetoacetamidoethyl acrylate; monomers bearing carbonyl-containing groups such as diacetone acrylamide (DAAM), diacetone methacrylamide; monomers bearing amide-functional groups such as acrylamide and methacrylamide; vinyltri-alkoxysilanes such as vinyltrimethoxysilane, vinyltriethoxysilane, vinyltris(2-methoxyethoxy)silane, vinyldimethylethoxysilane vinylmethyldiethoxysilane or (meth)

acryloxyalkyltrialkoxysilanes such as (meth) acryloxyethyltrimethoxysilane and (meth) acryloxypropyltrimethoxysilane; and mixtures thereof. The emulsion polymer may comprise, by weight based on the weight of the emulsion polymer, from zero to 10% of structural units of the functional group-containing ethylenically unsaturated monomers, for example, from 0.1% to 8%, from 0.5% to 6%, from 1% to 5%, or from 2% to 3%.

The emulsion polymer useful in the present invention may further comprise structural units of one or more multiethylenically unsaturated monomers including di-, tri-, tetra-, or higher multifunctional ethylenically unsaturated monomers. Examples of suitable multiethylenically unsaturated monomers include butadiene, allyl (meth)acrylate, divinyl benzene, ethylene glycol dimethacrylate, butylene glycol dimethacrylate, and mixtures thereof. The emulsion polymer may comprise, by weight based on the weight of the emulsion polymer, from zero to 5% of structural units of the multiethylenically unsaturated monomer, for example, 3% or less, 1% or less, 0.5% or less, or even zero.

The emulsion polymer useful in the present invention may have a weight average molecular weight of 70,000 g/mol or less, for example, 5,000 g/mol or more, 6,000 g/mol or more, 7,000 g/mol or more, 8,000 g/mol or more, 9,000 g/mol or more, 10,000 g/mol or more, 11,000 g/mol or more, 12,000 g/mol or more, 13,000 g/mol or more, 14,000 g/mol or more, 15,000 g/mol or more, 16,000 g/mol or more, 17,000 g/mol or more, 18,000 g/mol or more, or even 19,000 g/mol or more, and at the same time, 70,000 g/mol or less, 65,000 g/mol or less, 60,000 g/mol or less, 55,000 g/mol or less, 50,000 g/mol or less, 45,000 g/mol or less, 40,000 g/mol or less, 35,000 g/mol or less, 30,000 g/mol or less, 28,000 g/mol or less, 25,000 g/mol or less, 23,000 g/mol or less, or even 20,000 g/mol or less. Weight average molecular weight of the emulsion polymer herein can be determined by Gel Permeation Chromatography (GPC) as described in the Examples section below.

The emulsion polymer particles dispersed in the aqueous dispersion may have a particle size of from 30 to 500 nanometers (nm), for example, 50 nm or more, 60 nm or more, 70 nm or more, or even 80 nm or more, and at the same time, 300 nm or less, 200 nm or less, 150 nm or less, 120 nm or less, or even 100 nm or less. The particle size herein refers to Z-average size and may be measured by a Brookhaven BI-90 Plus Particle Size Analyzer.

The emulsion polymer useful in the present invention may be present in an amount of from 20% to 70%, from 30% to 55%, from 35% to 50%, or from 40% to 45%, by dry or solids weight based on the total weight of the aqueous dispersion.

The aqueous dispersion useful in the present invention also comprises one or more surfactants selected from sulphate surfactants, sulfonate surfactants containing no carboxyl or carboxylate group, or mixtures thereof. The surfactants useful in the present invention may have the structure of formula (I) or (II),

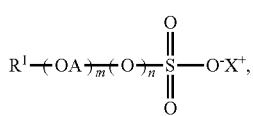

(I)

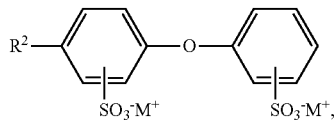

(II)

where $R^1$ and $R^2$ are each independently a substituted or unsubstituted linear, branched, or cyclic alkyl group having from 8 to 18 carbon atoms, from 10 to 14 carbon atoms, or from 10 to 12; or a substituted or unsubstituted arylalkyl group having from 6 to 30 carbon carbons, from 14 to 24 carbon atoms, or from 16 to 20 carbon atoms;

OA represents an ethoxy, propoxy, or butoxy group, or combinations thereof; preferably an ethoxy group;

$X^+$ and $M^+$ are each independently ammonium ion, or an alkali metal ion such as sodium ion and potassium ion, preferably sodium ion;

m is in the range of from 0 to 60; and n is 0 or 1.

In some embodiments, $R^1$ in formula (I) and $R^2$ in formula (II) are each independently a linear or branched alkyl group, preferably having from 10 to 14 carbon atoms.

Specific examples of $R^1$ in formula (I) and $R^2$ in formula (II) independently include dodecyl, undecyl, undecyl phenyl, octyl phenyl, undecyl phenyl, dodecyl phenyl, tridecyl phenyl and tridecyl.

m in formula (I) can be 0 or higher, 4 or higher, 5 or higher, 6 or higher, 7 or higher, 8 or higher, or even 10 or higher, and at the same time, 60 or less, 50 or less, 40 or less, 30 or less, 25 or less, 20 or less, 16 or less, or even 12 or less.

The surfactant useful in the present invention may be a sulphate surfactant having the structure of formula (I), wherein n=1 and m is in the range of from 4 to 60, preferably from 6 to 16. Commercially available sulphate surfactants (n=1) may include, for example, DISPONIL FES 993 sodium salt of a branched alcohol ethoxylate (m=10) sulphate, DISPONIL FES 77 sodium salt of a branched alcohol ethoxylate (m=30) sulphate, and DISPONIL FES 61 sodium salt of a branched alcohol ethoxylate (m=60) sulphate, all available from BASF; ABEX EP-110 ammonium nonylphenol ether (m=8) sulfate available from Solvay; and POLY-STEP B-19 sodium lauryl ether (m=30) sulfate, and POLY-STEP B-23 sodium lauryl ether (m=12) sulfate both available from Stepan.

The surfactant useful in the present invention may be a sulphonate surfactant having the structure of formula (I), wherein n=0 and m is in the range of from 0 to 60, or having the structure of formula (II). Commercially available sulfonate surfactants may include, for example, Rhodacal DS-4 Sodium dodecyl (Branched) benzene sulfonate and Rhodacal LDS-20 sodium dodecyl (linear) benzene sulfonate both available from Solvay, DOWFAX™ 2A1 alkyldiphenyloxide disulfonate salts available from The Dow Chemical Company (DOWFAX is a trademark of The Dow Chemical Company), and mixtures thereof.

The sulphate and/or sulfonate surfactant may be present in a combined amount of 0.1% or more, 0.3% or more, 0.5% or more, or even 0.8% or more, and at the same time, 10% or less, 8% or less, 5% or less, 3% or less, or even 1.5% or less, by weight based on the weight of the emulsion polymer.

The emulsion polymer useful in the present invention may be prepared by emulsion polymerization, of the monomers described above, in an aqueous medium, preferably in the presence of the sulphate and/or sulfonate surfactant described above. Monomers may be added neat or as an emulsion in water; or added in one or more additions or continuously, linearly or nonlinearly, over the reaction period of preparing the emulsion polymer. Total weight concentration of the monomers described above for preparing the emulsion polymer may be equal to 100%. The dosage of such monomer based on the total weight of the monomers, is substantially the same as the amount of each of these monomers as structural units in the emulsion polymer, based on the weight of the emulsion polymer. Types and levels of the monomers described above may be chosen to provide the obtained emulsion polymer with a glass transition temperature (Tg) suitable for different applications. The emulsion polymer may have measured Tgs in the range of from 0 to 100° C., from 10 to 80° C., from 20 to 60° C., from 30 to 55° C., or from 40 to 50° C. By "measured Tg" as used herein, is meant the glass transition temperature as determined by differential scanning calorimetry (DSC) according to the test method described in the Examples section below.

Temperature suitable for polymerization of the monomers may be lower than 100° C., in the range of from 10 to 95° C., or in the range of from 50 to 92° C. Multistage emulsion polymerization using the monomers described above can be used, which at least two stages are formed sequentially, and usually results in the formation of the multistage polymer comprising at least two polymer compositions.

Free radical initiators may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of the monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

One or more sulphate and/or sulfonate surfactants may be used in the polymerization process. The sulphate and/or sulfonate surfactant may be added prior to or during the polymerization of the monomers, or combinations thereof. A portion of the surfactant can also be added after the polymerization. These surfactants may be used in a combined amount of 0.1% or more, 0.3% or more, 0.5% or more, or even 0.8% or more, and at the same time, 10% or less, 5% or less, 3% or less, or even 1.5% or less, by weight based on the total weight of the monomers.

One or more chain transfer agents may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans, such as hydroxyethyl mercaptan, mercaptopropionic acid, and mixtures thereof. The chain transfer agent may be used in an effective amount to control the molecular weight of the emulsion polymer, for example, greater than 0.2%, from 0.3% to 10%, or from 0.4% to 5%, from 0.5% to 4%, from 1% to 3.5%, from 1.3% to 3.0%, from 1.7% to 2.5%, from 2.0% to 2.3%, by weight based on the total weight of the monomers.

After completing the polymerization process, the obtained aqueous dispersion may be neutralized by one or more bases to a pH value, for example, at least 5, from 6 to 10, from 6.2 to 9, from 6.4 to 8, from 6.6 to 7.5, or from 6.7 to 7.0. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The aqueous dispersion in the polyurethane composition may also comprise one or more diols or polyols. Suitable diols or polyols may comprise any cycloaliphatic diol or polyol having a molecular weight of from 100 to 500 and containing one or more 4 to 7 member aliphatic ring, or any oligomeric diol or polyol made from a cycloaliphatic diol or polyol having a molecular weight of from 100 to 500 and comprising at least 30% by weight of cycloaliphatic diol and/or polyol and having a weight average molecular weight of from 200 to 3000, from 200 to 2000, or from 200 to 1000. Examples of such diols or polyols include cyclohexanedimethanol (CHDM), especially 1,3 CHDM, 1,4 CHDM, mixtures thereof, dianhydro-d-glucitol, which has two 5 membered rings, each containing an oxygen atom, 4,8-Bis (hydroxymethyl)tricyclo [5.2.1.02,6] decane, and 2,2,4,4-tetramethyl cyclobutanediol, containing a 4 membered ring. As used herein the term "molecular weight" when referring to a cycloaliphatic diol or polyol refers to the mass of one mole of that cycloaliphatic diol or polyol in grams. As used herein, the term "weight molecular weight" of the oligomeric diols or polyols is a weight average molecular weight of a sample of that oligomeric diols or polyols as determined by GPC of the sample in tetrahydrofuran solvent as against a polystyrene molecular weight standard as calibration standard. EasiCal PS-2 standard (Agilent Technologies, Inc, Santa Clara, Calif.) against a polystyrene standard.

Oligomeric diols or polyols useful in the present invention may include any oligomers comprising the condensation reaction product of at least 30% preferably, at least 40%, by weight based on the total weight of reactants used to make the oligomer, of, any cycloaliphatic diol and/or polyol having a molecular weight of from 100 to 500 and containing one or more 4 to 7 member aliphatic ring. These oligomeric diols or polyols may include, for example, oligo- or polyesters, short chain alkyds, oligo- or polycarbonates, oligo- or polyethers and oligo- or polylactones having the desired low weight average molecular weight, for example, from 200 to 3000, from 200 to 2000, or from 200 to 1000. Such oligomers may be made by conventional means, such as by bulk polymerization. For example, polyesters may be made, e.g. from diacids or difunctional anhydrides or their salts cycloaliphatic diols or triols having one or more 4 to 7 member aliphatic rings. Likewise, other oligomers may be formed by reacting any cycloaliphatic polyol having a molecular weight of from 100 to 500 and containing one or more 4 to 7 member aliphatic ring in the presence of lactone reactants, e.g. caprolactone, to make polylactone polyols, or in the presence of carbonate reactants, e.g. trimethylene carbonate, to make polycarbonate polyols. An example of a suitable polyester polyol was made by condensing 2 CHDM molecules and 1 oxalic acid molecule, for which the polyol content was calculated as 76.2% by weight. Commercially available diols or polyols may include, for example, K-Flex 188 and K-Flex A308 polyester polyols from King Industries, Inc. (Norwalk, Conn.); UNOXOL™ diol, a mixture of 1,3 CHDM and 1,4 CHDM (The Dow Chemical Company, UNOXOL is a trademark of The Dow Chemical Company); and Polysorb P dianhydro-d-glucitol (Roquette, Lestrem, FR).

The diol or polyols included in the aqueous dispersion are either in neat form (for water-soluble diols or polyols), or for less water-soluble diols or polyols, are preferably micronized and stabilized with a stabilizing amount of a surfactant, preferably at a concentration in the range of about 0.5 to 5%, by weight based on total weight of the diols or polyols. Nonionic surfactants are preferred and may include those described below in the polyurethane composition. These diols or polyols may be present in an amount of from zero to 20%, from 0.1% to 15%, or from 0.2% to 10%, by weight based on the total solids weight of diols, polyols and the emulsion polymer.

The polyurethane composition of the present invention further comprises one or more water-dispersible polyisocyanates useful as crosslinkers. The polyisocyanates useful in the present invention may include any molecule having 2 or more isocyanate groups and that can be dispersed in or dissolved in water at room temperature, and mixtures thereof. Such polyisocyanates can be aliphatic, alicyclic, aromatic or mixtures thereof. The polyisocyanate may have an average functionality of >2 or from 2.5 to 10. Examples of suitable water-dispersible polyisocyanates include aliphatic diisocyanates, as well as dimers and trimers thereof, such as, for example, $C_2$-$C_8$ alkylene diisocyanates, such as tetramethylene diisocyanate and hexamethylene diisocyanate (HDI), 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate; alicyclic diisocyanates, as well as dimers and trimers thereof, such as, for example, isophorone diisocyanate (IPDI) and dicyclohexyl methane diisocyanate (HMDI), 1,4-cyclohexane diisocyanate, and 1,3-bis-(isocyanatomethyl)cyclohexane; aromatic diisocyanates, as well as dimers and trimers thereof, such as, for example, toluene diisocyanate (TDI), and diphenyl methane diisocyanate (MDI). Preferably, the polyisocyanate comprises aliphatic polyisocyanates. More preferably, the polyisocyanates are hexamethylene diisocyanate homopolymers, hexamethylene diisocyanate adducts, isophorone diisocyanate homopolymers, isophorone diisocyanate adducts, or mixtures thereof. The trimers (or isocyanurates) in the polyisocyanate may be prepared by methods known in the art, for example, as disclosed in U.S. patent publication no. 2006/0155095A1, to Daussin et al., by trimerizing an alicyclic diisocyanate (e.g. isophorone diisocyanate) in the presence of one or more trimerization catalyst, such as, for example, a tertiary amine or phosphine or a heterogeneous catalyst, and, if desired, in the presence of solvents and/or assistants, such as cocatalysts, expediently at elevated temperature, until the desired NCO content has been reached, and then deactivating the catalyst using inorganic and organic acids, the corresponding acid-halides and alkylating agents and, preferably, heating. Isocyanurate compositions containing isocyanurates from aliphatic diisocyanates may likewise be formed by cyclizing aliphatic diisocyanates in the presence of one or more trimerization catalyst and then deactivating the catalyst. Any of the isocyanurates can be further modified by conventional methods to contain urethane, urea, imino-s-triazine, uretonimine or carbodiimide moieties. Other suitable polyisocyanates may include, for example, polyether modified polyisocyanates (how to further modify the trimer), such as, for example, a polyalkoxylated isocyanurate having two isocyanate groups.

The polyisocyanate useful in the present invention may include one or more polyisocyanate prepolymers, which may be formed by reaction of bis(isocyanotomethyl)cyclohexane and/or another aliphatic diisocyanate with a monol, diol, diamine, or monoamine, which is then modified by the reaction of additional isocyanate to form allophanate or biuret modified prepolymers. Such prepolymers may further comprise a polyalkoxy or polyether chain. Alternatively, such prepolymers can then be mixed with a trimerization catalyst giving an allophanate or biuret modified polyisocyanate isocyanurate compositions. Preparation of such allophanate or biuret prepolymers, followed by trimerization, is known in the art, see for example, U.S. Pat. Nos. 5,663,272 and 6,028,158. Still further, suitable polyisocyanates may be modified by an aminosulfonic acid.

The polyurethane composition of the present invention may comprise equivalent ratios of the total number of isocyanate group equivalents in the polyisocyanates, which may contain several different polyisocyanates, to the total number of hydroxyl group equivalents in the aqueous dispersion (including the emulsion polymer and, optionally, diols or polyols) in the range of, for example, from 0.7:1:0 to 4.0:1.0, or from 0.8:1.0 to 2.5:1.0, or from 1.0:1.0 to 1.5:1.0.

The polyurethane composition of the present invention may optionally comprise one or more nonionic surfactants. The nonionic surfactants may have the structure of formula (III),

(III)

where $R^3$ represents a substituted or unsubstituted linear, branched, or cyclic alkyl group having from 8 to 18 carbon atoms or from 10 to 14 carbon atoms; or a substituted or unsubstituted arylalkyl group having from 14 to 24 carbon atoms or from 16 to 20 carbon atoms; AO represents an ethoxy, propoxy, or butoxy group, or a combination thereof, preferably an ethoxy group; and p is in the range of from 4 to 60. Preferred $R^3$ is a linear or branched alkyl group having from 10 to 14 carbon atoms. p in formula (III) can be 4 or higher, 6 or higher, 8 or higher, or even 10 or higher, and at the same time, 60 or less, 50 or less, 40 or less, 30 or less, or even 20 or less. Commercially available nonionic surfactants may include, for example, TRITON™ X-405 octylphenol ethoxylate (p=40), TRITON™ NP-9 nonylphenol ethoxylate (p=9), ECOSURF™ SA-9 fatty alcohol polyglycolether (p=9), and TERGITOL™ 15-S-40 fatty alcohol polyglycol ether (p=40), all available from The Dow Chemical Company (TRITON, ECOSURF, and TERGITOL are all trademarks of The Dow Chemical Company). The non-ionic surfactant may be present in an amount of from zero to 5% or from 0.1% to 1%, by weight based on the weight of the emulsion polymer, The polyurethane composition of the present invention may further comprise one or more catalyst to enhance curing. The catalyst can be any suitable catalyst for two-component waterborne polyurethane composition. Examples include metal based catalysts such as tin-, bismuth-, zinc-, aluminum-, zirconium-containing catalysts or tertiary amine catalysts including aliphatic and cyclo-aliphatic tertiary amine catalysts which are mono-, di- or tri-amines, and mixtures thereof. Examples of suitable metal based catalysts may include, for example, dibutyltin dilaurate, dibutyltin mercaptide, dibutyltin sulfide, dimethyltin mercaptide, dibutyltin mercaptoester, zirconium dionate, Al dionate, bismuth neodecanoate, and zinc amine compounds. Tertiary amine catalysts may include, for example, triethylene diamine, triethylene amine, 1,4-diazabicyclo[2.2.2]octane, 6-(dibutylamino)-1,8-diazabicyclo[5.4.0]undec-7-ene, dimethyl cyclohexyl amine and etc. The catalyst may be present in an amount of from 0.01% to 2.5% or from 0.1% to 1.0%, by weight based on the total polyisocyanate and hydroxy group-containing component (e.g., the emulsion polymer, and optionally the diols or polyols) solids.

The polyurethane composition of the present invention may further comprise one or more pigments. As used herein, the term "pigment" refers to a particulate inorganic material which is capable of materially contributing to the opacity or hiding capability of a coating. Such materials typically have a refractive index greater than 1.8 and include inorganic pigments and organic pigments. Examples of suitable inorganic pigments include titanium dioxide ($TiO_2$), zinc oxide, zinc sulfide, iron oxide, barium sulfate, barium carbonate, or mixtures thereof. Preferred pigment used in the present invention is $TiO_2$. The aqueous coating composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The polyurethane composition may have a pigment volume concentration (PVC) of from zero to 75%, from 5% to 50%, or from 10% to 30%.

The polyurethane composition of the present invention may further comprise conventional additives such as, for example, colorants, light stabilizers, ultraviolet (UV) absorbing compounds, leveling agents, wetting agents, dispersants, coalescents, neutralizers, defoamers, or rheology modifiers. These additives may be present in an amount of from zero to 20%, from 1 to 10%, by weight based on the weight of the polyurethane composition.

The polyurethane composition of the present invention may be prepared with techniques known in the art. A process of preparing the aqueous coating composition typically comprises mixing the aqueous dispersion (also known as "part A") comprising the emulsion polymer, the sulphate and/or sulfonate surfactant, and optionally, the diols or polyols, pigments, and other additives, along with the water-dispersible polyisocyanate (also known as "part B") immediately before application. The polyurethane composition can be cured at ambient temperature (25° C.), or at temperatures ranging from 4° C. to 150° C., preferably, from ambient conditions to 80° C. Cure temperatures may be varied depending on the substrate. Curing times generally range from 10 minutes at elevated temperatures to 1 to 14 days at from 10 to 50° C. Examples of suitable substrates include concrete, cementious substrates, wood, metals, stones, asphalt, plastics, elastomeric substrates, glass or fabrics.

The polyurethane composition of the present invention is useful for producing coatings, with or without a pigment or extender, an adhesive, a sealant, a primer, a caulk composition. The two-component polyurethane composition can provide coatings made therefrom with an initial 60° gloss of 90 or higher, and even after storage at room temperature for at least 6 hours, can still provide coatings made therefrom with a 60° gloss of 70 or higher. The polyurethane composition may provide coatings made therefrom with a hardness of H or harder, 2H or harder, or even 3H or harder. The two-component polyurethane composition may also provide coatings with satisfactory chemical resistance to sustain from >200 times of MEK rubs. Gloss, hardness and chemical resistance can be measured according to the test methods described in the Examples section below.

The present invention further provides polyurethane coatings made from the two-component polyurethane composition on any of the substrates mentioned above. Such coatings can be multilayer coatings over a primer layer and, optionally, a basecoat or color coat. The coatings can be architecture coatings, general industrial finish coatings, marine and protective coatings, automotive coatings, auto refinish coatings, plastic coatings, wood coatings, coil coatings, and civil engineering coatings.

EXAMPLES

Some embodiments of the invention will now be described in the following Examples, wherein all parts and percentages are by weight unless otherwise specified.

Styrene (ST), 2-ethylhexyl acrylate (EHA), methacrylic acid (MAA), and methyl methacrylate (MMA) are all available from Langyuan Chemical Co., Ltd.

Hydroxyethyl methacrylate (HEMA), n-Dodecyl mercaptan (n-DDM), $NH_4OH$, t-butyl hydroperoxide (t-BHP), ammonia persulfate (APS), isoascorbic acid (IAA), $FeSO_4 \cdot 7H_2O$, and ethylenediamine tetraacetic acid tetrasodium salt are all available from Sinopharm Chemical Reagent Co., Ltd.

Phosphoethyl methacrylate (PEM) is available from Solvay. 2-Acrylamido-2-methylpropanesulfonic acid sodium salt (AMPS) is available from The Hanerchem Company.

DISPONIL FES 993 (Fes 993) non-reactive surfactant, available from BASF, is a branched alcohol ethoxylate sulphate, sodium salt, with ethylene oxide (EO) unit of 11.

RHODAFAC RS-710 (R-710) non-reactive surfactant, available from Solvay, is a branched alcohol ethoxylate based phosphate.

AEROSOL A-102 (A-102) non-reactive surfactant, available from Solvay, is a fatty alcohol ethoxylate based sulfosuccinate.

KATHON™ XL 1.5% biocide is available from The Dow Chemical Company.

The following materials are used in preparing water-borne paints in the examples:
- DISPERBYK-190 (BYK 190) dispersant is available from BYK Additives & Instruments.
- SURFYNOL TG wetting agent is available from Evonik Industries.
- TI-PURE R-706 (R-706) titanium dioxide, available from DuPont, is used as pigment.
- TEGO Airex 902 W (902W) defoamer is available from BYK Additives & Instruments.
- DOWANOL™ PnB Glycol Ether (PnB), available from The Dow Chemical Company, is used as a coalescent.
- ACRYSOL™ RM-8W NPR (RM-8W) rheology modifier, available from The Dow Chemical Company, is a hydrophobically modified ethylene oxide urethane (HEUR).
- AQUOLIN 268 hexamethylene diisocyanate water-dispersible hardener is available from Wanhua Chemical Company.
- KATHON, DOWANOL, and ACRYSOL are all trademarks of The Dow Chemical Company.

The following standard analytical equipment, test methods and synthesis process are used in the Examples.

Particle Size Measurement

The particle size of polymer particles in an aqueous dispersion was measured by using Brookhaven BI-90 Plus Particle Size Analyzer, which employs the technique of photon correlation spectroscopy (light scatter of sample particles). This method involved diluting 2 drops of an aqueous dispersion to be tested in 20 mL of 0.01 M sodium chloride (NaCl) solution, and further diluting the resultant mixture in a sample cuvette to achieve a desired count rate (K) (e.g., K ranging from 250 to 500 counts/sec for diameter in the range of 10-300 nm). Then the particle size of the aqueous polymer dispersion was measured and reported as a Z-average diameter by intensity.

Tg Measurement

Tg was measured by DSC. A 5-10 milligram (mg) sample was analyzed in a sealed aluminum pan on a TA Instrument DSC Q2000 fitted with an auto-sampler under nitrogen atmosphere. Tg measurement by DSC was with three cycles including, from –40 to 180° C., 10° C./min ($1^{st}$ cycle, then hold for 5 minutes to erase thermal history of the sample), from 180 to –40° C., 10° C./min ($2^{nd}$ cycle), and from –40 to 180° C., 10° C./min ($3^{rd}$ cycle). Tg was obtained from the $3^{rd}$ cycle by taking the mid-point in the heat flow versus temperature transition as the Tg value.

GPC Analysis

GPC analysis was performed generally by Agilent 1200. A sample was dissolved in tetrahydrofuran (THF)/formic acid (FA) (5%) with a concentration of 2 mg/mL and then filtered through 0.45 μm polytetrafluoroethylene (PTFE) filter prior to GPC analysis. The GPC analysis was conducted using the following conditions:

Column: One PLgel GUARD columns (10 μm, 50 millimeters (mm)×7.5 mm), Two Mixed B columns (7.8 mm×300 mm) in tandem; column temperature: 40° C.; mobile phase: THF/FA (5%); flow rate: 1.0 mL/minute; Injection volume: 100 μL; detector: Agilent Refractive Index detector, 40° C.; and calibration curve: PL Polystyrene I Narrow standards with molecular weights ranging from 2329000 to 580 g/mol, using polynom 3 fitness.

Gloss Tests

Gloss measurement was performed at the given angle (60°) using a BYK Gardener micro-TRI-gloss meter (BYK-Gardner USA, Columbia, Md.), according to ASTM D523 (1999).

Initial gloss measurement: A two-component polyurethane composition, immediately after mixing all ingredients therein, was drawn down on an aluminum panel (Q-panel A-46) at 150 μm wet thickness. After drying at room temperature for 20 minutes, the panels were further dried at 60° C. for 40 minutes, and then an initial gloss was measured.

Gloss after storage measurement: All ingredients in a polyurethane composition were mixed and stored at room temperature for 6 hours. Then panels coated by the resultant polyurethane composition were prepared according to the same procedure and drying/curing conditions as described above in measuring the initial gloss. Such panels were then measured for gloss after storage.

An average of three separate readings was recorded for the initial gloss and the gloss after storage, respectively. An acceptable initial gloss (60°) is 90 or more, and a gloss after storage (60°) of 70 or more indicates good gloss retention.

Chemical Resistance Test

Methyl ethyl ketone (MEK) double rub resistance was used to test the chemical resistance of coating films, and it was performed according to ASTM D5402 (1999). A two-component polyurethane composition was drawn down on an aluminum panel (Q-panel A-46) at 150 μm wet thickness. After drying at room temperature for 20 minutes, the panels were further dried at 60° C. for 40 minutes, followed by further drying at room temperature for 7 days. The resultant coated panels were used for the MEK double rub resistance test. An Atlas crockmeter was used to perform the double rubs and cheesecloth was used to hold enough MEK solution. 800 double rubs were performed on each coating film, and the number of double rubs it took for the first breakthrough of the coating film to occur was recorded. Two measurements were performed on each coating film.

Hardness Test

Pencil hardness test was performed according to ASTM D3363 (2011) on steel substrate (Q-panel R-46). A two-component polyurethane compositions was drawn down on an aluminum panel (Q-panel A-46) at 150 μm wet thickness. After drying at room temperature for 20 minutes, the panels were further dried at 60° C. for 40 minutes, followed by further drying at room temperature for 7 days, the coated panels were used for the pencil hardness test. The hardness of pencil lead was recorded when the pencil did not cut into or gouge the film. H or harder is acceptable.

Monomer Emulsion Stability

The stability of a monomer emulsion was evaluated by visually observing the state of a liquid obtained by allowing the monomer emulsion to stand for 30 minutes without stirring at room temperature. No layer separated indicates a stable monomer emulsion, otherwise, layer separated indicates a monomer emulsion with poor stability.

Example (Ex) 1

A stable monomer emulsion was prepared by mixing 318 gram (g) of deionized (DI) water, 23 g of DISPONIL Fes 993 surfactant (30%), 173 g of MMA, 306 g of ST, 204 g of EHA, 304 g of HEMA, 16 g of MAA, 16 g of PEM, and 21 g of n-DDM.

DI water (600 g) and Fes 993 Surfactant (30%) (42.6 g) were charged to a five-liter multi-neck flask fitted with mechanical stirring. The contents of the flask were heated to 90° C. under nitrogen atmosphere. Then, aqueous ammonia (25%, 2.5 g) in DI water (16.9 g), 29 g of the monomer emulsion, and ammonium persulfate (APS) (2.03 g) in DI water (16.9 g) were added to the stirred flask, followed by a rinse of DI water (3.75 g). The remaining monomer emulsion was further added at 86° C. over 160 minutes, followed by a rinse of DI water (30 g). At the end of polymerization, FeSO$_4$.7H$_2$O (0.005 g) in DI water (15.75 g) mixed with ethylenediamine tetraacetic acid tetrasodium salt (0.005 g) in DI water (15.75 g), a solution of t-BHP (70%, 1.6 g) in DI water (32.76 g) and a solution of IAA (0.78 g) in DI water (34.32 g), a solution of t-BHP (0.78 g) in DI water (16.41 g), and a solution of IAA (0.39 g) in DI water (17.19 g) were all added to the flask at 60° C., then ammonia (25%, 7.02 g) in DI water (16.65 g) was added at 50° C. to obtain an aqueous dispersion.

Exs 2-5

Aqueous dispersions of Exs 2-5 were prepared, respectively, according to the same procedure as described above for preparing the aqueous dispersion of Ex 1 above, based on monomer compositions as given in Table 1. The monomer emulsion used for preparing each aqueous polymer dispersion showed good stability.

Comparative (Comp) Exs A-I

These aqueous dispersions were prepared, respectively, according to the same procedure as described above for preparing the aqueous dispersion of Ex 1 above, based on monomer compositions and surfactant types given in Table 1. When preparing the aqueous polymer dispersions of Comp Exs A and B, the same amount, by solids weight, of RS-710 (25% active) and A-102 (30% active), respectively, was used to replace Fes 993 (30% active) surfactant in all steps. Properties of the obtained aqueous dispersions are given in Table 2. These polymer dispersions were used as binders in paint formulations prepared below.

TABLE 1

Monomer Compositions and Surfactant Type

| | Composition[1] | Surfactant |
| --- | --- | --- |
| Ex 1 | 30ST/20EHA/17MMA/30HEMA/1.5PEM/1.5MAA//2n-DDM | Fes 993 |
| Ex 2 | 30ST/20EHA/17MMA/30HEMA/1PEM/2MAA//2n-DDM | Fes 993 |
| Ex 3 | 30ST/20EHA/17MMA/30HEMA/3PEM//2n-DDM | Fes 993 |
| Ex 4 | 30ST/20EHA/17MMA/30HEMA/1.5PEM/1.5MAA//0.5n-DDM | Fes 993 |
| Ex 5 | 36ST/21.6EHA/19.4MMA/20HEMA/1.5PEM/1.5MAA//2n-DDM | Fes 993 |
| Comp Ex A | 30ST/20EHA/17MMA/30HEMA/1.5PEM/1.5MAA//2n-DDM | RS-710 |
| Comp Ex B | 30ST/20EHA/17MMA/30HEMA/1.5PEM/1.5MAA//2n-DDM | A-102 |
| Comp Ex C | 30ST/20EHA/17MMA/30HEMA/0.25PEM/2.75MAA//2n-DDM | Fes 993 |
| Comp Ex D | 30ST/20EHA/17MMA/30HEMA/3MAA//2n-DDM | Fes 993 |
| Comp Ex E | 30ST/20EHA/17MMA/30HEMA/3AMPS//2n-DDM | Fes 993 |
| Comp Ex F | 30ST/20EHA/17MMA/30HEMA/1.5PEM/1.5MAA | Fes 993 |
| Comp Ex G | 42.77ST/25EHA/24.23MMA/5HEMA/1.5PEM/1.5MAA//2n-DDM | Fes 993 |
| Comp Ex H | 38ST/22.3EHA/21.7MMA/15HEMA/1.5PEM/1.5MAA//2n-DDM | Fes 993 |
| Comp Ex I | 30ST/20EHA/17MMA/30HEMA/1.5PEM/1.5MAA//0.2n-DDM | Fes 993 |

[1]Numbers separated by a single slash ("/") indicates weight percentage of monomers, based on the total weight of monomers, while a double slash ("//") implies addition of a chain transfer agent, numbers refer to weight percentage of transfer agent based on the total weight of monomers.

TABLE 2

Properties of Aqueous Dispersions

| | Particle size (nm) | pH | Solids (%) | Viscosity[1] (centipoise) | Measured Tg[2] (° C.) | Mn[4] | Mw[4] |
| --- | --- | --- | --- | --- | --- | --- | --- |
| Ex 1 | 76 | 6.96 | 42.75 | 3589 | 43 | 6629 | 16586 |
| Ex 2 | 79 | 6.48 | 40.56 | 3189 | 48 | 6941 | 17343 |
| Ex 3 | 84 | 6.78 | 42.01 | 1262 | 43 | 6853 | 17128 |
| Ex 4 | 74 | 6.72 | 41.70 | 2749 | 54 | 12721 | 45946 |
| Ex 5 | 69 | 6.79 | 42.56 | 4309 | 42 | 7020 | 17061 |
| Comp Ex A | 87 | 6.78 | 41.98 | 3369 | — | n.d. | n.d. |
| Comp Ex B | 83 | 6.59 | 42.08 | 1330 | — | n.d. | n.d. |
| Comp Ex C | 82 | 6.40 | 41.52 | 2699 | — | n.d. | n.d. |
| Comp Ex D | 86 | 7.05 | 41.91 | 3319 | 39 | n.d. | n.d. |
| Comp Ex E | 89 | 8.51 | 41.70 | 1730 | — | n.d. | n.d. |
| Comp Ex F | 76 | 6.73 | 42.44 | 3229 | 60 | 18546 | 108470 |
| Comp Ex G | 75 | 6.98 | 40.70 | 564 | — | n.d. | n.d. |
| Comp Ex H | 65 | 6.71 | 42.72 | 3889 | 42 | n.d. | n.d. |
| Comp Ex I | 76 | 6.60 | 41.90 | 2969 | — | 16398 | 76055 |

[1]Viscosity measured by Brookfield viscometer DV-I Primer (60 rpm, spindle #2); [2]Tg measured by DSC; [4]M$_n$ and Mw obtained by the GPC analysis described above.

Paint Formulations and Comparative Paint Formulations

Paint formulations (i.e., coating compositions) and comparative (Comp) paint formulations were prepared based on formulations given in Table 3 and Table 4, respectively. The mole ratio of NCO group to OH group in each paint formulation was 1.2:1. Ingredients in the grind stage were mixed using a high speed Cowles disperser at 1,500 revolutions per minute (rpm) for 30 minutes. Then, ingredients in the letdown stage were added using a conventional lab mixer to obtain Part A. Part A of each paint formulation was put overnight, and then Part B was added into Part A using a high speed Cowles disperser to form the paint formulation 600 rpm for 10 minutes. The resultant paint formulations were measured for properties according to the test methods described above and results are given in Table 5.

TABLE 3

Paint Formulations

| gram | Paint 1 | Paint 2 | Paint 3 | Paint 4 | Paint 5 |
|---|---|---|---|---|---|
| Part A | | | | | |
| Grind | | | | | |
| Water | 4.00 | 4.00 | 4.00 | 4.00 | 4.00 |
| BYK 190 | 0.43 | 0.43 | 0.43 | 0.43 | 0.43 |
| SURFYNOL TG | 0.30 | 0.30 | 0.30 | 0.30 | 0.30 |
| Ammonia | 0.20 | 0.20 | 0.20 | 0.20 | 0.20 |
| R-706 | 15.00 | 15.00 | 15.00 | 15.00 | 15.00 |
| RM-8W | 0.46 | 0.46 | 0.46 | 0.46 | 0.46 |
| 902W | 0.05 | 0.05 | 0.05 | 0.05 | 0.05 |
| DI water | 6.00 | 6.00 | 6.00 | 6.00 | 6.00 |
| Letdown | | | | | |
| Binder Ex 1 | 42.80 | | | | |
| Binder Ex 2 | | 44.05 | | | |
| Binder Ex 3 | | | 43.55 | | |
| Binder Ex 4 | | | | 43.90 | |
| Binder Ex 5 | | | | | 48.80 |
| DI water | 16.72 | 15.48 | 15.88 | 15.07 | 12.63 |
| PnB | 3.66 | 3.66 | 3.75 | 4.21 | 4.23 |
| RM-8W | 0.20 | 0.20 | 0.20 | 0.20 | 0.20 |
| Part B | | | | | |
| AQUOLIN 268 | 10.18 | 10.17 | 10.18 | 10.18 | 7.70 |
| Total | 100 | 100 | 100 | 100 | 100 |
| solid | 43.47% | 43.46% | 43.47% | 43.49% | 43.47% |

TABLE 4

Comparative Paint Formulations

| gram | Paint A | Paint B | Paint C | Paint D | Paint E | Paint F | Paint G | Paint H | Paint I |
|---|---|---|---|---|---|---|---|---|---|
| Part A | | | | | | | | | |
| Grind | | | | | | | | | |
| Water | 4.00 | 4.00 | 4.00 | 4.00 | 4.00 | 4.00 | 4.00 | 4.00 | 4.00 |
| BYK 190 | 0.43 | 0.43 | 0.43 | 0.43 | 0.43 | 0.43 | 0.43 | 0.43 | 0.43 |
| SURFYNOL TG | 0.30 | 0.30 | 0.30 | 0.30 | 0.30 | 0.30 | 0.30 | 0.30 | 0.30 |
| Ammonia | 0.20 | 0.20 | 0.20 | 0.20 | 0.20 | 0.20 | 0.20 | 0.20 | 0.20 |
| R-706 | 15.00 | 15.00 | 15.00 | 15.00 | 15.00 | 15.00 | 15.00 | 15.00 | 15.00 |
| RM-8W | 0.46 | 0.46 | 0.46 | 0.46 | 0.46 | 0.46 | 0.46 | 0.46 | 0.46 |
| 902W | 0.05 | 0.05 | 0.05 | 0.05 | 0.05 | 0.05 | 0.05 | 0.05 | 0.05 |
| DI water | 6.00 | 6.00 | 6.00 | 6.00 | 6.00 | 6.00 | 6.00 | 6.00 | 6.00 |
| Letdown | | | | | | | | | |
| Binder (dosage/type) | 43.60/ Comp Ex A | 43.33/ Comp Ex B | 44.05/ Comp Ex C | 43.67/ Comp Ex D | 43.87/ Comp Ex E | 43.10/ Comp Ex F | 61.10/ Comp Ex G | 52.20/ Comp Ex H | 43.65/ Comp Ex I |
| DI water | 15.92 | 16.24 | 15.48 | 15.94 | 15.93 | 15.60 | 4.54 | 10.09 | 15.37 |
| PnB | 3.66 | 3.65 | 3.66 | 3.57 | 3.38 | 4.48 | 5.30 | 4.87 | 4.22 |
| RM-8W | 0.20 | 0.20 | 0.20 | 0.20 | 0.20 | 0.20 | 0.20 | 0.20 | 0.20 |
| Part B | | | | | | | | | |
| AQUOLIN 268 | 10.18 | 10.14 | 10.17 | 10.18 | 10.18 | 10.17 | 2.42 | 6.20 | 10.12 |
| Total | 100 | 100 | 100 | 100 | 100 | 100 | 100 | 100 | 100 |
| Solids, % | 43.48 | 43.38 | 43.46 | 43.48 | 43.47 | 43.47 | 43.48 | 43.50 | 43.46 |

The above obtained paint panels were evaluated for gloss according to the test method described above and results are given in Table 5. As shown in Table 5, the binders comprising RS-710 or A-102 surfactant provided paints with worse gloss retention (Paints A and B). The binder made from 0.25% of PEM and 2.75% of MAA provided paints with 60° gloss of 64.8 after 6-hour storage at room temperature. The binder made from 3% of MAA or AMPS without PEM provided paints with unsatisfactory gloss retention. The binders having an average weight molecular weight of 108,470 or 76,055 showed low initial gloss and/or poor gloss retention (Paints F and I). Paint G comprising the binder prepared from 5% of HEMA gelled after storage at room temperature for 6 hours. The binder comprising 15% of structural units of HEMA provided paints (Paint H) with unsatisfactory gloss retention. In contrast, paint formulations of the present invention all showed an initial 60° gloss of 90 or higher, and good gloss retention as indicated by a 60° gloss of 70 even after storage for 6 hours at room temperature.

TABLE 5

Gloss Properties of Paints

| | 60° gloss | | | |
| --- | --- | --- | --- | --- |
| | Initial gloss[1] | Gloss after storage[2] | Chemical resistance | Hardness |
| Paint 1 | 91.7 | 78.2 | 392 | 3H |
| Paint 2 | 92.9 | 70.9 | 377 | 3H |
| Paint 3 | 91.1 | 85.3 | 456 | 3H |
| Paint 4 | 91.5 | 79.9 | 565 | 3H |
| Paint 5 | 92.9 | 73.5 | 215 | 3H |
| Paint A | 92.9 | 63.4 | 321 | 3H |
| Paint B | 92.3 | 46.6 | 322 | F |
| Paint C | 93 | 64.8 | 403 | 3H |
| Paint D | 93 | 60 | 343 | 3H |
| Paint E | 92.1 | 16.1 | 388 | 3H |
| Paint F | 83.5 | 65 | 461 | 3H |
| Paint G | 91.8 | Gel | 48 | H |
| Paint H | 92.6 | 61.7 | 152 | 2H |
| Paint I | 86 | 67.7 | 423 | 3H |

[1]The paint formulation was applied to a Q-panel A-46 immediately after mixing.
[2]The paint formulation was applied to a Q-panel A-46 after storage at room temperature for 6 hours.

What is claimed is:

1. A two-component polyurethane composition comprising,
   (A) an aqueous dispersion comprising an emulsion polymer and a surfactant selected from the group consisting of a sulphate surfactant, a sulfonate surfactant containing no carboxyl or carboxylate group, or mixtures thereof; wherein the emulsion polymer with a weight average molecular weight of 70,000 g/mol or less comprises, by weight based on the weight of the emulsion polymer,
   greater than 0.25% of structural units of a phosphorous-containing acid monomer and/or a salt thereof, greater than 15% of structural units of a hydroxy-functional alkyl (meth)acrylate, structural units of a monoethylenically unsaturated nonionic monomer, and from zero to 10% of structural units of an additional acid monomer and/or a salt thereof; and
   (B) a water-dispersible polyisocyanate.

2. The polyurethane composition of claim 1, wherein the surfactant has the structure of formula (I),

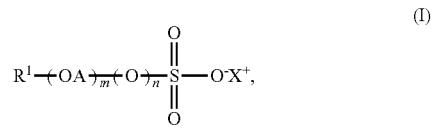

where $R^1$ represents a substituted or unsubstituted linear, branched, or cyclic alkyl group having from 8 to 18 carbon atoms, or a substituted or unsubstituted arylalkyl group having from 6 to 30 carbon carbons; OA represents an ethoxy, propoxy, or butoxy group, or combinations thereof; $X^+$ represent ammonium ion or an alkali metal ion; m is in the range of from 0 to 60; and n is 0 or 1.

3. The polyurethane composition of claim 2, wherein, in formula (I), m is in the range of from 4 to 60 and n is 1.

4. The polyurethane composition of claim 1 wherein the emulsion polymer has an average weight molecular weight of from 10,000 to 50,000 g/mol.

5. The polyurethane composition of claim 1 wherein the emulsion comprises, by weight based on the weight of the emulsion polymer, from 16% to 40% of structural units of the hydroxy-functional alkyl (meth)acrylate.

6. The polyurethane composition of claim 1 wherein the phosphorous-containing acid monomer and a salt thereof is selected from the group consisting of phosphoethyl (meth)acrylate, phosphopropyl (meth)acrylate, phosphobutyl (meth)acrylate, allyl ether phosphate, salts thereof, or mixtures thereof.

7. The polyurethane composition of claim 1 wherein the hydroxy-functional alkyl (meth)acrylate is selected from the group consisting of 2-hydroxyethyl acrylate, 2-hydroxyethyl methacrylate, 2-hydroxypropylacrylate, 2-hydroxypropyl methacrylate, or mixtures thereof.

8. The polyurethane composition of claim 1 wherein the emulsion polymer has a measured glass transition temperature of from 0 to 100° C.

9. The polyurethane composition of claim 1 wherein the aqueous dispersion comprises from 0.1% to 10% of the surfactant, by weight based on the weight of the emulsion polymer.

10. The polyurethane composition of claim 1 wherein the equivalent ratio of the total number of isocyanate group equivalents in the polyisocyanate, to the total number of hydroxyl group equivalents in the aqueous dispersion is in the range of from 3.0:1.0 to 0.8:1.0.

11. The polyurethane composition of claim 1 wherein the emulsion polymer has a particle size of from 50 to 100 nm.

12. The polyurethane composition of claim 1 wherein the emulsion polymer comprises, by weight based on the weight of the emulsion polymer,
   from 1% to 3% of structural units of the phosphorous-containing acid monomer and/or a salt thereof,
   from 20% to 35% of structural units of the hydroxy-functional alkyl (meth)acrylate,
   from 55% to 75% of structural units of the monoethylenically unsaturated nonionic monomers selected from styrene, methyl methacrylate, cyclohexyl methacrylate, butyl acrylate, 2-ethylhexyl acrylate, or mixtures thereof, and
   from zero to 5% of structural units of the additional acid monomer and/or a salt thereof.

13. The polyurethane composition of claim 1 further comprising a pigment.

14. A process of preparing a two-component polyurethane composition, comprising:
- (i) providing an aqueous dispersion comprising an emulsion polymer with a weight average molecular weight of 70,000 g/mol or less and a surfactant selected from the group consisting of a sulphate surfactant, a sulfonate surfactant containing no carboxyl or carboxylate group, or mixtures thereof; wherein the emulsion polymer prepared by emulsion polymerization in the presence of a chain transfer agent comprises, by weight based on the weight of the emulsion polymer, greater than 0.25% of structural units of a phosphorous-containing acid monomer and/or a salt thereof, greater than 15% of structural units of a hydroxy-functional alkyl (meth)acrylate, structural units of a monoethylenically unsaturated nonionic monomer, and from zero to 10% of structural units of an additional acid monomer and/or a salt thereof; and
- (ii) mixing the aqueous dispersion from step (i) with a water-dispersible polyisocyanate.

15. The process of claim 14, wherein the chain transfer agent is n-dodecyl mercaptan, cetyl mercaptan, octadecanethiol, octyl mercaptan, hexanethiol, decanethiol, or a mixture thereof.

* * * * *